May 19, 1970     P. E. BESSIERE     3,512,616

HYDRODYNAMIC RETARDER

Filed July 24, 1968     2 Sheets-Sheet 1

INVENTOR
PIERRE E. BESSIERE

BY Stevens, Davis, Miller & Mosher
ATTORNEYS

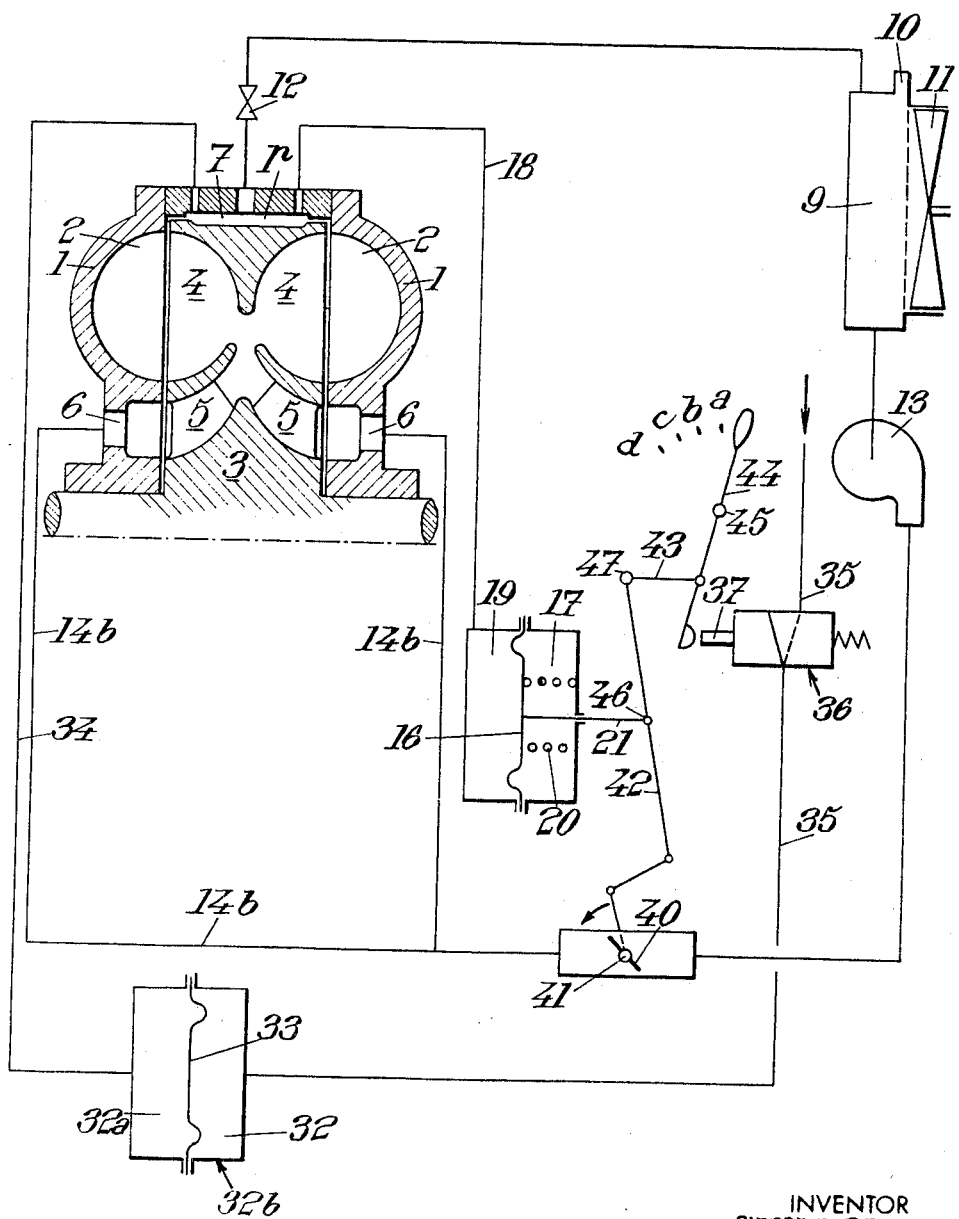

United States Patent Office 3,512,616
Patented May 19, 1970

3,512,616
HYDRODYNAMIC RETARDER
Pierre Etienne Bessiere, Golf de St.-Nom-la-Breteche, France, assignor to Labavia-S.G.E., Paris, France, a society of France
Filed July 24, 1968, Ser. No. 747,381
Claims priority, application France, July 28, 1967, 116,233
Int. Cl. F16d 57/02
U.S. Cl. 188—90   9 Claims

ABSTRACT OF THE DISCLOSURE

The outlet pressure of the retarder acts, via the intermediary of a diaphragm, on a valve in the feed conduit of this retarder in a manner to maintain this outlet pressure approximately constant over a wide range of speeds of the vehicle on which the retarder is mounted. The driver, by varying the free cross-section of a throttling, can intervene to make the level of the outlet pressure of the retarder, and hence the magnitude of the braking torque, vary.

---

This invention relates to hydrodynamic retarders or brakes comprising a regulator member which determines the degree of filling of the retarder; more particularly, the invention is concerned with hydrodynamic retarders which serve for the braking of vehicles.

Hitherto, hydrodynamic retarders—in order to permit a sufficient braking torque to be obtained at low speed, that is to say at low speed of the vehicles on which they are mounted—must have large dimensions, which leads, at high speed, to an excessive power.

The chief object of this invention is to mitigate this disadvantage and to provide hydrodynamic retarders with regulation devices arranged so that the retarders develop, for each speed, a torque which substantially responds to the speed retardation needs of the vehicle.

It is known that the braking torque developed by a hydrodynamic retarder depends on various factors among which the speed of rotation of the rotor of the retarder and the pressure of feed of the retarder which is essential for its filling are particularly important; on these factors depends the pressure at the outlet of the retarder.

According to the principal feature of this invention, the degree of filling of the retarder is controlled by the outlet pressure of this retarder, and this in such a manner that, for a determined setting of the regulation device, this pressure follows a predetermined law as a function of the speed of the retarder and preferably preserves, at least approximately, the same value whatever be the variation of the instantaneous speed within a wide range of speeds. In this manner, there is obtained, as a function of the speed, a reduced variation of the braking torque which is well suited to respond to the needs of the speed retardation.

According to a particularly advantageous embodiment of the invention, the regulation devices according to the invention are completed by regulating means which permit the driver to choose, at will, the level of the outlet pressure of the retarder, so that he can choose the magnitude of the braking torques obtained for the various speeds.

The present invention is more particularly applicable to retarders comprising an integrated overfeed pump and more especially still to retarders of the type indicated in which a suction effect is generated at the exit of the overfeed pump into the work chambers.

The invention will, in any case, be able to be well understood from the following complementary description and the accompanying drawings, given merely by way of example.

In these drawings:

FIG. 3 shows, schematically, another hydrodynamic retarder installation established according to another embodiment of the invention.

Figure 1:
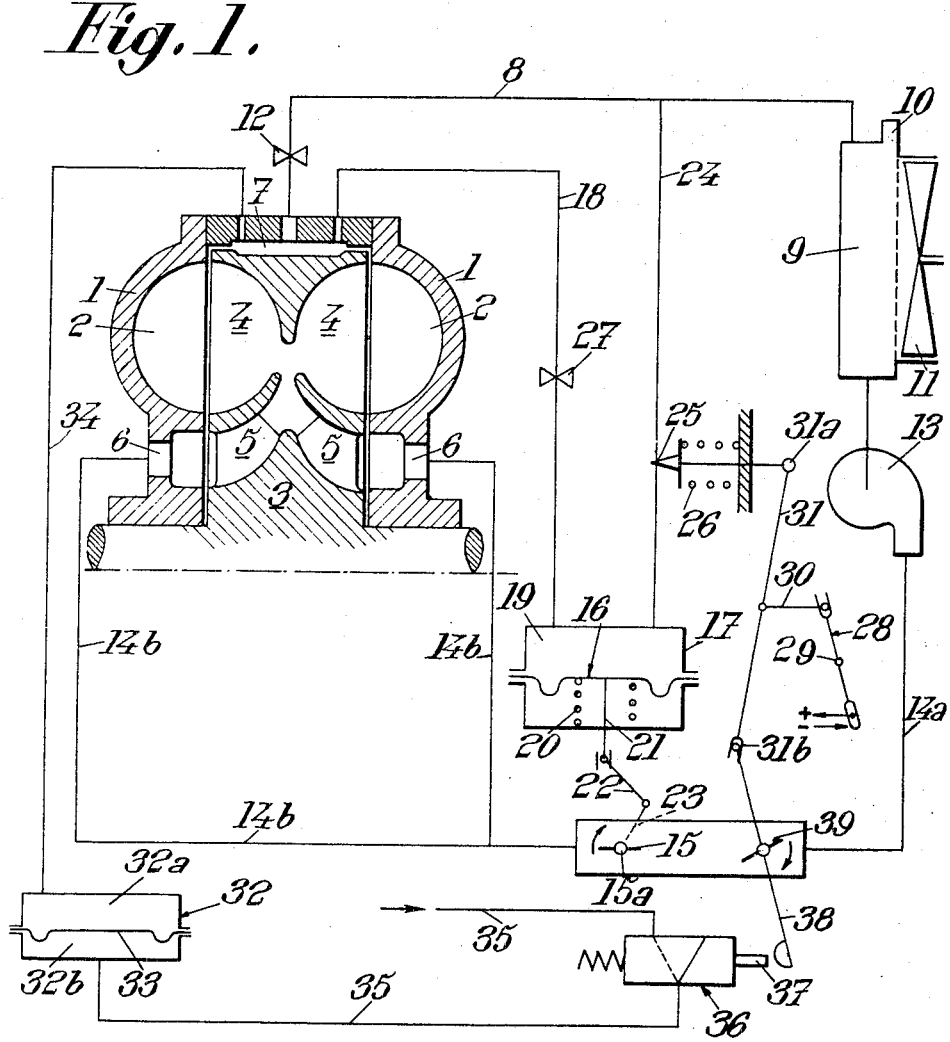
FIG. 1 shows, schematically, a hydrodynamic retarder installation established according to a first embodiment of the invention.

The retarders represented in the drawings are particularly intended to be mounted on an automobile vehicle such as a truck or a coach.

With regard to the hydrodynamic brake proper, it can be arranged in various manners. Preferably, this hydrodynamic brake is a brake which comprises, incorporated, an overfeed pump. Thus the hydrodynamic brake forming part of the installations represented in FIGS. 1 and 3—which hydrodynamic brake is formed essentially by a stator 1 having two series of blades 2 as well as by a rotor 3 connected to the shaft to be braked and also provided with two series of blades 4—comprises an incorporated double overfeed pump 5 having a suction effect.

The braking liquid, formed for example by water, oil or by any other appropriate liquid, arrives into the hydrodynamic brake by openings 6 situated on opposite sides of its plane of symmetry which is perpendicular to the axis of rotation of the rotor; this liquid is then delivered, by the overfeed pump 5, into the work chambers of the brake to arrive next in the outlet collector 7 of this brake. In this outlet collector 7 a certain pressure $p$ prevails which depends, in particular, on the speed of rotation of the rotor 3 and on the feed pressure of the hydrodynamic brake; this pressure $p$ determines the degree of filling of the hydrodynamic brake.

In the installation represented by way of example in FIGS. 1 and 3, the braking liquid issues from the collector 7 to be lead in a conduit 8 to a radiator 9. If the braking liquid is water, this radiator can, as is assumed in the installations of FIGS. 1 and 3, be at the same time the radiator for the cooling water of the motor of the vehicle on which the hydrodynamic brake is mounted. This radiator communicates with the free air at 10 and is cooled in the usual manner by a fan 11. The loss of pressure that the liquid undergoes at the interior of the conduit 8 should be sufficient to reduce the pressure of the liquid to atmospheric pressure before the arrival of this liquid into the radiator 9. For this purpose, a throttling 12 can be inserted in this conduit between the collector 7 and the radiator 9.

The liquid, after having been cooled in the radiator 9, is taken up by a pump 13—which is for example arranged in the form of a centrifugal pump and which can be the circulation pump of the motor—to be lead back to the inlet 6 of the hydrodynamic brake by a conduit 14a, 14b in which is inserted a member, for example in the form of a valve 15, which produces a variable loss of pressure in this conduit 14a, 14b and consequently causes the filling of the retarder to be varied according to the position that it (the valve 15) occupies. It is this valve 15 which, according to the principal feature of the invention, is controlled by the outlet pressure $p$ which prevails in the collector 7 of the hydrodynamic brake, and this in such a manner that this pressure follows a predetermined law as a function of the speed of the retarder and independent of disturbances which might manifest themselves in the hydraulic circuit (variations of the feed pressure, for example). Preferably, the control of the valve 15 by the pressure $p$ is such that this pressure preserves at least approximately the same value for all the speeds which are located within a wide range of speeds. In this manner, there is obtained, as a function of the speed, a reduced variation of the braking torque which is well suited to respond to the needs of the speed retardation of the vehicle on which the retarder is mounted.

The means which make the pressure $p$ in the collector 7 of the retarder act on the valve 15 advantageously comprise a diaphragm 16 which is located at the interior of a casing 17 and on one of the sides of which acts the pressure $p$ which prevails in the collector 7 and which is lead for this purpose, via a conduit 18, into the chamber 19 of the casing 17. On the other face of the diaphragm 16 acts an opposing spring 20.

The diaphragm 16 is connected to the valve 15 which is adapted to pivot about a fixed spindle 15a by a transmission indicated schematically in the drawings and comprising, for example, according to FIG. 1, a rod 21 and a tie-rod 22 which connects the end of the rod 21 to a lever 23 which pivots with the valve 15. The ensemble of these pieces is arranged in a manner such that, when the pressure $p$ and consequently the pressure in the chamber 19 increase, the valve pivots about its spindle 15a in the clockwise direction, which reduces the free cross-section of the part of the conduit 14a, 14b in which the valve is inserted, and increases the loss of pressure caused by this valve, whereas, in the contrary case, the cross-section of the conduit 14a, 14b is enlarged and the loss of pressure reduced.

By the variation of the loss of pressure produced by the valve 15, which variation leads to a corresponding variation of the feed of the hydrodynamic retarder, it can be arranged that the pressure $p$, in the collector 7, remains practically constant.

Figure 2:
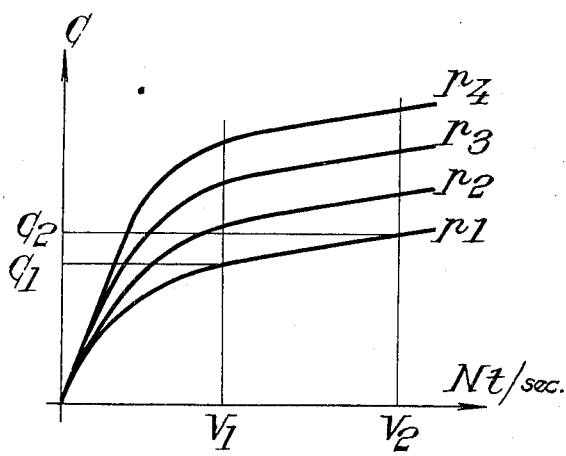
FIG. 2 shows the variation of the braking torque as a function of the speed for outlet pressures maintained constant but having different values or levels.

FIG. 2 shows the variation of the braking torque, indicated on the ordinate, as a function of the speed of rotation of the retarder, indicated on the abscissa, for practically constant pressures $p$ in the outlet collector 7. It is seen, for example, that if the overall apparatus is regulated so that the pressure in the outlet collector remains practically equal to $p_1$, the braking torque between two speeds $v_1$ and $v_2$ remains practically constant between the rather widely separated values $v_1$ and $v_2$.

It is evident that, by an appropriate kinematic arrangement of the transmission between the diaphragm 16 and the valve 15, any desired law can be obtained for the variation of the outlet pressure of the retarder. Thus can be obtained—according to the braking conditions that it is desired to achieve—not only the constancy of the pressure but also a slight increase of this pressure with the speed or equally well a reduction of this pressure with the speed.

The installation represented in FIG. 1 further comprises means which permit the driver to choose, at will, the level of the pressure $p$ which prevails in the outlet collector of the retarder, so that he can choose the magnitude of the braking torque obtained, while preserving the principal advantage of the invention, which is to avoid modifications of this torque which are too great when the speed of the retarder varies.

For this purpose, according to the embodiment represented in FIG. 1, the chamber 19 of the casing 17, containing the diaphragm 16, is connected, not only via the conduit 18, to the outlet collector 7 of the retarder, but also via conduit 24, to a region where a determined pressure prevails which is considerably lower than the pressure $p$. Thus the conduit 24 can be connected to a region of the conduit 8 situated downstream of the throttling 12 or directly to the radiator 9. Moreover, there is provided, in this conduit 24, a variable throttling 25, controlled for example by a needle, which a spring 26 seeks to maintain in a determined position for which the throttling is completely closed or presents a minimum free cross-section. Moreover, there is inserted, in the case, in the conduit 18, another throttling 27 which can be of a fixed cross-section.

It is easily understood that the greater the free cross-section of the throttling 25 in the conduit 24 is, the smaller is the action of the pressure $p$ on the valve 15, which pressure seeks to displace the valve in the direction of its closing, and the greater is the filling of the retarder.

By a variation of the free cross-section of the throttling 25, the pressure in the outlet collector 7 can be maintained at practically constant values equal to $p_1$, $p_2$, $p_3$ or $p_4$, and thus braking torques can be obtained which, while having different values according to the magnitude of the pressure $p$ in the collector 7, vary little in the entire range of speeds between $v_1$ and $v_2$.

To control the throttling 25, a lever 28 is for example provided, adapted to pivot about a fixed spindle 29, this lever 28 being connected, by a rod 30, to a lever 31 of which one of the ends 31a is articulated to a control rod of the needle which regulates the free cross-section of the throttling 25, whereas its other end 31b is considered for the moment as being fixed. The position of the lever 28 represented in FIG. 1 is the position for which the throttling 25 is closed or at least has its minimum value, so that if the hydrodynamic retarder is fed with liquid, the pressure in the collector 7 has its value $p_1$, that is to say its minimum value which, when the brake is in operation, gives rise to the braking torques represented by the curve $p_1$ in FIG. 2. If the driver desires to increase the braking torque, he makes the lever 28 pivot in the direction of the arrow +, which increases the free cross-section of the throttling 25 and produces, in the collector 7, pressures $p_2$, $p_3$ or $p_4$. The variation of the braking torque as a function of the speed is then indicated by the curves $p_2$, $p_3$ and $p_4$ of FIG. 2. Conversely, if the driver desires to reduce the braking effect, he closes more or less the throttling 25, which produces a lowering of the pressure in the outlet collector 7.

According to a preferred embodiment, the same lever 28 also controls the device which makes the liquid enter into the circuit of the braking installation when the braking should be applied and which empties the circuit of the hydrodynamic retarder when the braking effect should be stopped. This device which, itself, does not form part of the invention comprises, for example, a reservoir 32 which is divided into two parts by a diaphragm 33. A certain quantity of braking liquid, such as water, is located in the compartment 32a situated above the diaphragm 33, whereas compressed air can be introduced into the compartment 32b situated below the diaphragm 33.

The compartment 32a is connected to the hydrodynamic retarder by a conduit 34, whereas the compartment 32b is connected to a source of compressed air by a conduit 35. In this conduit is inserted a cock or analogous member 36 which, according to its position, makes the compartment 32b communicate with the source of compressed air or which makes this compartment communicate with the ambient air. This cock is controlled by a rod 37 on which acts one of the ends of a lever 38 which controls at the same time a valve 39 inserted in the feed conduit 14a, 14b of the retarder, whereas its other end is articulated to the end 31b of the lever 31.

The operation of the installation represented in FIG. 1 is the following.

As long as the hydrodynamic brake is not put into operation, the control means mentioned above have the position indicated in this figure. The valve 39 is closed. The valve 15 is open. The compartment 32b of the reservoir 32 communicates with the free air and the hydrodynamic brake is empty of liquid. Moreover, the needle which controls the throttling 25 is pushed, by the spring 26, into the position in which it closes this throttling or gives it its minimum value determined by an abutment (not shown).

If the driver wishes to put the hydrodynamic brake into operation, he makes the lever 28 pivot in the clockwise direction indicated in FIG. 1 by the sign +.

Since the end 31a is, at this moment, maintained in a determined position by the action of the spring 26 on the needle which controls the throttling 25, this movement of the lever 28 has first for its effect to make the lever 31 pivot about its end 31a, which brings the valve 39 from its closed position to its wide open position in which the valve 39 is stopped by an abutment. At the same time, the end of the lever 38 actuates the cock 36 in a manner to make the compartment 32b of the reservoir 32 communicate with the source of compressed air. The pressure of this air, on deforming the diaphragm 33, drives the braking liquid, which is located in the compartment 32a of the reservoir 32, into the hydrodynamic retarder. The circuit of this retarder is thus filled with water, which permits it to begin its braking action. The braking torque then varies according to the curve $p_1$ of FIG. 2 since at this moment the throttling 25 is still closed or has its minimum value.

If the driver continues to act on the lever 28 in the clockwise direction, the lever 31, whose end 31b has been stopped by the abutment against which the valve 39 bears in its wide open position, then pivots around this end 31b and progressively opens the throttling 25. According to the degree of opening of this throttling, the braking torque follows one of the upper curves $p_2$, $p_3$ or $p_4$ of FIG. 2.

If the driver ought to stop the braking, he should displace the lever 28 in the counter-clockwise direction, which has first for its effect to close progressively the throttling 25, so that the braking torque corresponds to lower curves of FIG. 2 until it arrives at the curve. $p_1$.

Finally, the pivoting of the lever 28 in the counter-clockwise direction closes the valve 39 and puts the cock 36 in communication with the ambient air, which produces the emptying of the hydrodynamic retarder and puts it out of operation.

FIG. 3 shows a variant of the installation represented in FIG. 1.

In FIG. 3, the parts which correspond to the parts represented in FIG. 1 have the same reference numerals.

The installation represented in FIG. 3 comprises, in place of the two valves 15 and 39 of FIG. 1, only a single valve 40 which can be actuated directly by the driver, the position of this valve being nevertheless able to be corrected by the pressure $p$ which prevails in the outlet collector 7 of the hydrodynamic retarder.

According to this figure, the valve 40, which can turn about a fixed spindle 41, is connected to a lever 42 whose upper end is connected, by a rod 43, to a control lever 44 on which the driver acts and which can be brought into several positions indicated in FIG. 3 by the points $a$, $b$, $c$ and $d$. This lever pivots about the spindle 45 and it can act, by its lower end, on the rod 37 of the cock 36 permitting the filling and the emptying of the hydrodynamic retarder. Between its ends, at a region 46, the lever 42 is articulated to the rod 21 of the diaphragm 16 which, on one side, is under the action of the pressure $p$ in the outlet collector 7 of the hydrodynamic brake, and on its other side, is under the action of the spring 20. It should be noted here that no throttling is necessary in the conduit 18 leading the pressure $p$ into the chamber 19 of the casing 17.

The operation of the installation represented in FIG. 3 is the following.

When the retarder should be put into operation, the driver displaces the lever 44 to the position $a$, which causes, on the one hand, the filling of the retarder due to the action of the lower end of this lever on the rod 37 of the cock 36, and on the other hand, a pivoting of the lever 42 about the point 46 such that the valve 40, which was previously closed, it brought into its position of partial opening. If it is assumed that the lever 44 remains, at least for a certain time, in the position $a$, the articulation 47 of the rod 43 on the upper end of the lever 42 remains fixed and the pressure $p$, which acts in the chamber 19, can cause, in combination with the spring 20, displacement of the lever 42 about this articulation. This displacement of the lever 42 acts on the valve 40 in order thus to maintain approximately constant the pressure $p$ prevailing in the collector 7. When the driver displaces the lever 44 to one of the other positions $b$, $c$ or $d$, the valve 40 is opened wider, so that the pressure $p$, in the outlet collector 7 of the retarder, increases, but this pressure, for a determined position of the lever 44, remains practically constant under the action of the diaphragm 16 which is actuated by this pressure and by the spring 20.

Whatever be the embodiment of the regulation according to the invention, it has the considerable advantage that it permits braking torques to be obtained which vary according to determined curves and which correspond to the position that the driver gives to control member 28 or 44. Factors which are difficult to control, such as the speed of the circulation pump 13—which pump is most often driven with a speed that varies with the speed of the motor of the vehicle—or other disturbing factors, are rendered ineffective.

Many variants of the invention are possible, for example, a variant in which the pump 13, instead of being a centrifugal pump whose discharge rate is variable by a variation of the loss of pressure in its delivery conduit, is a volumetric pump comprising, in its delivery conduit, a delivery valve or an analogous member permitting the withdrawal, from the feed of the hydrodynamic retarder, of a greater or lesser quantity of braking liquid, which quantity is controlled by the pressure at the outlet of the retarder.

Many other modifications and variations are also possible, wihout departing from the spirit or scope of the present invention, so that the invention should not be limited to the embodiments described by way of example.

What I claim is:

1. A hydrodynamic retarder for retarding the speed of a rotary shaft, comprising, a stator and a rotor adapted to cooperate with each other and with a braking liquid for exerting a braking torque on said rotor, said rotor being adapted to be connected to said shaft, inlet means for the inlet of said braking liquid into said retarder, and outlet means for the outlet of said braking liquid out of said retarder, conduit means for leading said braking liquid from said outlet means and to said inlet means, said conduit means forming, with said retarder, a closed circuit in which said braking liquid circulates, said closed circuit including a throttling, a radiator and a centrifugal feed pump, a regulator member for determining the degree of filling of said retarder with said braking liquid, said regulator member being a throttling member which is inserted in said conduit means on the delivery side of said centrifugal feed pump, between said centrifugal feed pump and said inlet means of the retarder and which is controlled as a function of the outlet pressure at said outlet means of said retarder.

2. A hydrodynamic retarder for retarding the speed of a rotary shaft, comprising, a stator and a rotor adapted to cooperate with each other and with a braking liquid for exerting a braking torque on said rotor, said rotor being adapted to be connected to said shaft, inlet means for the inlet of said braking liquid into said retarder, and outlet means for the outlet of said braking liquid out of said retarder, conduit means for leading said braking liquid from said outlet means and to said inlet means, a regulator member for determining the degree of filling of said retarder with said braking liquid, said regulator member being controlled as a function of the outlet pressure at said outlet means of said retarder, a pressure-responsive member for controlling said regulator member, said pressure-responsive member including a displaceable member displaceable by a pressure brought from said outlet pressure, and a control member, adapted to be operated by the operator, connected by a transmission to said regulator member, whereby the operator can set said regulator member, said displaceable member being operatively connected to said transmission for exerting a correction effect on said transmission.

3. A retarder according to claim 2, wherein said displaceable member is a diaphragm.

4. A hydrodynamic retarder for retarding the speed of a rotary shaft, comprising,
   a stator and a rotor adapted to cooperate with each other and with a braking liquid for exerting a braking torque on said rotor, said rotor being adapted to be connected to said shaft,
   inlet means for the inlet of said braking fluid into said retarder, and outlet means for the outlet of said braking fluid out of said retarder,
   conduit means for leading said braking liquid from said outlet means and to said inlet means,
   a regulator member for determining the degree of filling of said retarder with said braking liquid, said regulator member being controlled as a function of the outlet pressure at said outlet means of said retarder,
   deriving means for deriving a pressure from said outlet pressure and for applying this derived pressure to a pressure-responsive member for controlling said regulator member,
   and regulating means, adapted to be controlled by the operator of the retarder, disposed in said deriving means for varying the magnitude of the difference between said outlet pressure and said derived pressure.

5. A retarder according to claim 4, wherein a control member, adapted to be operated by the operator, is connected to said regulator member, whereby the operator can set said regulator member, said control member being movable in one direction to increase the degree of filling of said retarder and in the opposite direction to decrease the degree of filling of said retarder, and wherein a device is provided for putting the retarder into operation by causing the introduction of the braking liquid into said retarder and for putting the retarder out of operation by causing the emptying of the braking liquid out of said retarder, said control member being adapted to act, at the beginning of its movement in said one direction and at the end of its movement in said other direction, on said device, for making said device put said retarder into operation and out of operation respectively.

6. A retarder according to claim 4, comprising an integrated overfeed pump having an exit where a suction effect is generated.

7. A retarder according to claim 4, wherein said pressure-responsive member includes a displaceable diaphragm having a compartment disposed on one side thereof, said diaphragm being displaceable by said derived pressure and controlling directly said regulator member, and wherein a first conduit, in which is inserted a first throttling, connects said outlet means with said compartment, and wherein a second conduit, in which is inserted an adjustable second throttling, connects said compartment with a region where a pressure prevails that is lower than said outlet pressure, said second throttling comprising said regulating means and being connected, via a transmission, to a control member adapted to be operated by the operator, for adjusting said second throttling.

8. A retarder according to claim 7, wherein said conduit means form, with said retarder, a closed circuit in which said braking fluid circulates, said closed circuit including a radiator and a feed pump, wherein a third throttling is inserted in said conduit means between said outlet means and said radiator, and wherein said second conduit opens into said conduit means between said third throttling and said radiator.

9. A retarder according to claim 8, wherein a control member, adapted to be operated by the operator, is connected to said regulator member, whereby the operator can set said regulator member, said control member being movable in one direction to increase the degree of filling of said retarder and in the opposite direction to decrease the degree of filling of said retarder, and wherein a device is provided for putting the retarder into operation by causing the introduction of the braking liquid into said retarder and for putting the retarder out of operation by causing the emptying of the braking liquid out of said retarder, said control member being adapted to act, at the beginning of its movement in said one direction and at the end of its movement in said other direction, on said device, for making said device put said retarder into operation and out of operation respectively, and wherein said regulator member comprises two throttling members disposed in series in said conduit means between said feed pump and said inlet means of said retarder, one of said two throttling members being connected to said displaceable diaphragm to be controlled thereby, and the other of said two throttling members being connected to said transmission interconnecting said adjustable second throttling and said control member adapted to be operated by the operator.

References Cited
UNITED STATES PATENTS

| | | |
|---|---|---|
| 1,610,830 | 12/1926 | Walker. |
| 2,638,746 | 5/1953 | Kelley _____ 60—54 |
| 3,297,114 | 1/1967 | Erdman et al. |
| 3,373,847 | 3/1968 | Rohacs _____ 188—90 |

GEORGE E. A. HALVOSA, Primary Examiner

U.S. Cl. X.R.
60—54